W. J. BREWER.
ROAD VEHICLE.
No. 10,635. Reissued Aug. 18, 1885.
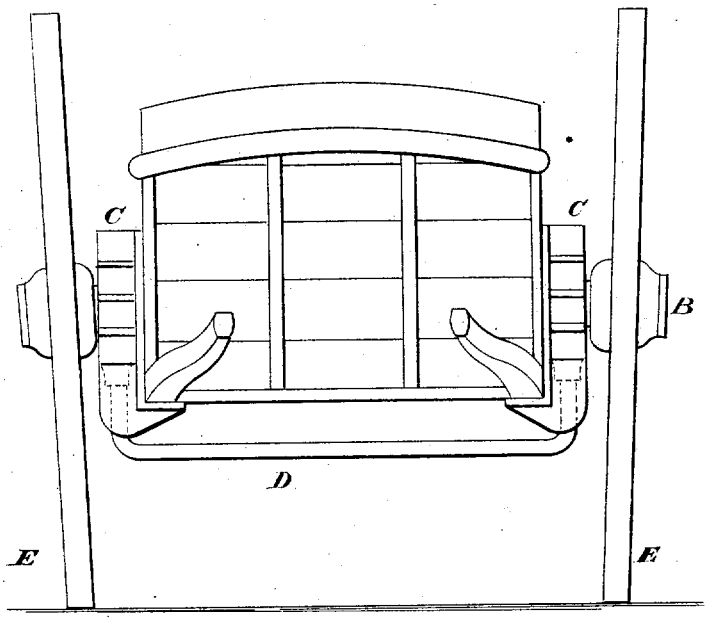
Fig. 1.
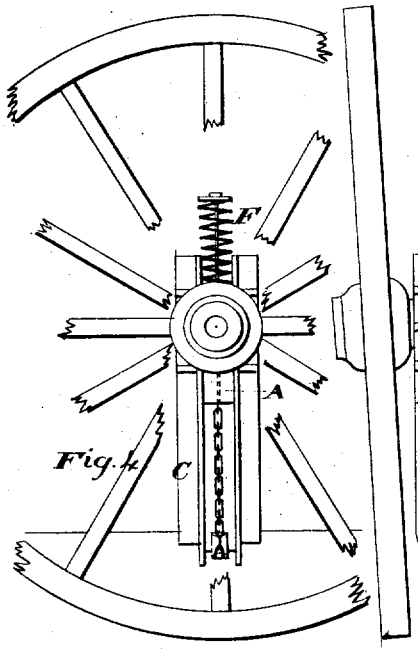
Fig. 4.
Fig. 2.
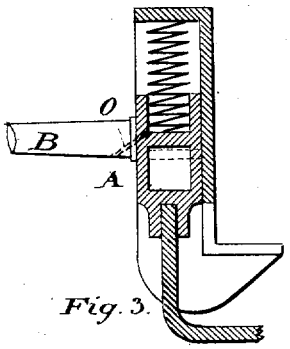
Fig. 3.
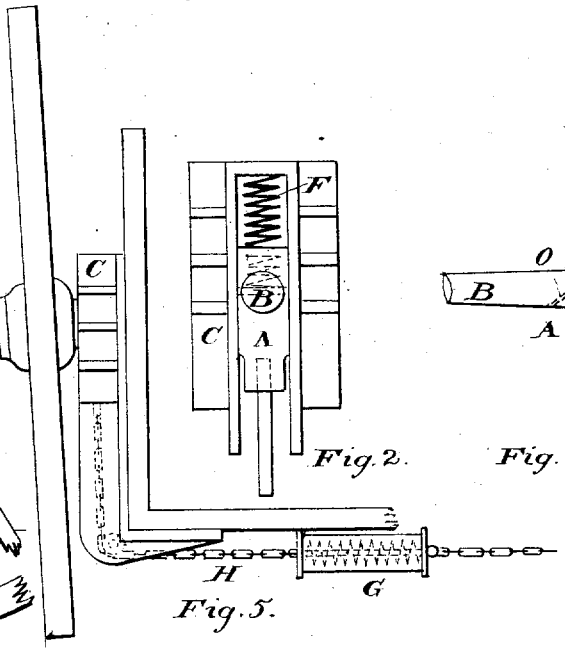
Fig. 5.
Witnesses
Delbert H. Decker
W. B. Stearns
WILLIAM J. BREWER
By his Attorney
Geo. L. Ewin
N. PETERS, Photo-Lithographer, Washington, D. C.

UNITED STATES PATENT OFFICE.

WILLIAM JOHN BREWER, OF LONDON, ENGLAND.

ROAD-VEHICLE.

SPECIFICATION forming part of Reissued Letters Patent No. 10,635, dated August 18, 1885.

Original No. 312,960, dated February 24, 1885. Application for reissue filed July 7, 1885. Patented in England April 12, 1883, No. 1,862.

*To all whom it may concern:*

Be it known that I, WILLIAM JOHN BREWER, a subject of the Queen of Great Britain, residing at London, in England, have invented a new and useful Improvement in Road-Vehicles, (patented in Great Britain by Letters Patent No. 1,862 of 1883, dated April 12, 1883,) of which the following is a specification.

This invention relates to improvements in the construction of the carrying or load-bearing and strain-distributing parts of road-vehicles generally; and it consists in certain novel combinations of parts hereinafter set forth and claimed.

A sheet of drawings accompanies this specification as part thereof.

Figure 1 of these drawings is an end view of a cart illustrating the main features of this invention. Figs. 2 and 3 are respectively an elevation and a vertical section of parts of the same. Fig. 4 is a side view showing a preferred axle-connection and other modifications, and Fig. 5 is a partial end view illustrating additional modifications.

Like letters of reference indicate corresponding parts in the several figures.

A represents a vertical slide at each side of the vehicle, and B an axle-spindle projecting rigidly from the outer side of said slide.

C C represent flanged angle-braces closely embracing the lower angles of the body of the vehicle and bolted thereto and forming dovetail or undercut vertical guides for said slides.

D represents an axle-connection in the form of a bent bar of steel or iron uniting the slides A beneath the body, so as to keep the pair of wheels E E applied to the axle-spindles B in proper working relation to each other by transmitting vertical motion from one slide to the other; and F represents a spiral spring above each slide for cushioning the load and steadying the movements of the slides up and down in their guides.

I prefer to construct each slide A with a recess, O, in its top, to receive the lower end of a spiral spring, F, so applied, and to contain a supply of lubricant for the axle-spindle projecting from said slide, a duct (shown in dotted lines in Fig. 3) extending obliquely downward from said recess to the surface of the spindle. The upper end of the spring may abut against the upper end of the angle-brace, closed for this purpose, as shown in Figs. 1, 2, and 3, or against a bracket attached to the side of the vehicle-body, as shown in Fig. 4, a guide rod working through the spring and bracket in the latter case.

G, Fig. 5, represents a spiral spring common to a pair of spindle-slides applied thereto through the medium of the axle-connection H, which in this case is in the form of a chain running over a grooved roller at the corner of each angle-brace, as shown in this figure and Fig. 4. Such a flexible connection is preferred as affording a strong and simple motion-transmitter which is incapable of transmitting lateral strain to the slides or their guides.

The angle-braces C in each form of my improvement serve not only to form guides for spindle-slides A as aforesaid but preclude undue strain on the body as a result of the isolation of the axle-spindles, and they may also re-enforce the union with the body of rigidly-attached shafts or thills, as indicated in Fig. 1.

Having thus described my said improvement in road-vehicles, I claim as my invention and desire to patent under this specification--

1. The combination, with the body of a road-vehicle, of flanged angle-braces closely embracing the lower angles of the body and forming vertical guides for slides from which the axle-spindles project and to which the spring or springs are applied, substantially as herein specified.

2. The combination, in a road-vehicle, of a body provided with flanged angle-braces closely embracing the lower angles of the body and forming vertical guides for slides from which the axle-spindles project and to which the spring or springs are applied, and a connection between said slides extending horizontally across below the body and out of contact therewith, substantially as herein specified.

3. The combination, in a road-vehicle, of a body provided with flanged angle-braces closely embracing the lower angles of the body and forming vertical guides for slides from which the axle-spindles project, and a connection between said slides in the form of a chain working over rollers in said angle-braces and extending horizontally across below the body and out of contact therewith, substantially as herein specified.

4. In a road-vehicle, a vertical slide, A, having a stud-spindle, B, projecting therefrom, and constructed with a recess, O, in its upper part, connected by a duct with the surface of the said spindle for retaining a spiral spring above said slide and supplying the spindle with lubricant, substantially as herein specified.

WILLIAM JOHN BREWER.

Witnesses:

SAM. P. WILDING,

RICHARD A. HOFFMANN.